(12) United States Patent
Kotov et al.

(10) Patent No.: US 8,794,175 B2
(45) Date of Patent: Aug. 5, 2014

(54) ROLLING CONTACT LAYER-BY-LAYER ASSEMBLY

(75) Inventors: Nicholas A. Kotov, Ypsilanti, MI (US); Anastasios John Hart, Ann Arbor, MI (US); Javier Canavati Leal, Etna, WY (US); Brett Michael Perry, Walker, MI (US); Neil Hasmukh Patel, Horsham, PA (US); Justin Lefevre, East Jordan, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1224 days.

(21) Appl. No.: 12/630,822

(22) Filed: Dec. 3, 2009

(65) Prior Publication Data
US 2010/0189913 A1 Jul. 29, 2010

Related U.S. Application Data

(60) Provisional application No. 61/200,786, filed on Dec. 3, 2008.

(51) Int. Cl.
*B05C 1/02* (2006.01)
*B05C 1/10* (2006.01)
*B82Y 30/00* (2011.01)
*B82Y 40/00* (2011.01)

(52) U.S. Cl.
CPC . *B05C 1/022* (2013.01); *B05C 1/10* (2013.01); *B82Y 30/00* (2013.01); *B82Y 40/00* (2013.01)
USPC ............ 118/230; 118/232; 118/255; 118/256

(58) Field of Classification Search
USPC .......... 118/DIG. 11, 225, 230, 232, 255, 256, 118/260, 266, 268; 15/88, 88.1, 104.04, 15/256.51; 399/343–360; 101/425; 134/168 C, 167 C, 169 C, 171, 166 C, 134/199
See application file for complete search history.

(56) References Cited

U.S. PATENT DOCUMENTS 2,960,706 A * 11/1960 Dunham .............................. 15/4
3,120,805 A * 2/1964 Simon ........................... 101/425

(Continued)

FOREIGN PATENT DOCUMENTS

WO   WO 01/72878   10/2001
WO   WO 01/93363   12/2001

(Continued)

OTHER PUBLICATIONS

Canavati, Javier, et al., "MRoller: Final Report. Layer-by-Layer Assembly of Nano-Composites," available at http://deepblue.lib.umich.edu/bitstream/handle/2027.42/62492/ME450%20Fall2008%20Final%20Report%20-%20Team%2025%20-%20Assembly%20of%20Nanocomposites.pdf?sequence=1, pp. 1-66 (Dec. 11, 2008) (downloaded on Mar. 21, 2013).

(Continued)

*Primary Examiner* — Laura Edwards
(74) *Attorney, Agent, or Firm* — Harness, Dickey & Pierce, P.L.C.

(57) ABSTRACT

A rolling contact layer-by-layer assembly device comprises at least one roller, a cylinder substrate and a motor to rotate the cylinder substrate. The assembly device optionally includes at least one rinsing nozzle and air applicator. The rollers each provide a polyelectrolyte solution to the surface of the cylinder substrate, the polyelectrolyte solutions having an affinity for each other. Excess polyelectrolyte solution can be washed using the rinsing nozzle followed by a drying step prior to the application of the second polyelectrolyte solution. A plurality of bilayers is produced by the continuous application of polyelectrolyte solutions to form an LBL article such as a nanocomposite article or film. The film is then removed from the surface of the cylinder substrate.

12 Claims, 12 Drawing Sheets

(56) References Cited

U.S. PATENT DOCUMENTS

| | | | |
|---|---|---|---|
| 5,201,951 A * | 4/1993 | Shigeta | 118/73 |
| 5,208,111 A | 5/1993 | Decher et al. | |
| 5,238,713 A | 8/1993 | Sago et al. | |
| 5,472,502 A | 12/1995 | Batchelder | |
| 5,518,767 A | 5/1996 | Rubner et al. | |
| 5,827,602 A | 10/1998 | Koch et al. | |
| 5,861,061 A | 1/1999 | Hayes et al. | |
| 6,460,424 B1 | 10/2002 | Dubas et al. | |
| 6,585,936 B1 | 7/2003 | Shah | |
| 6,689,338 B2 | 2/2004 | Kotov | |
| 6,805,904 B2 | 10/2004 | Anders et al. | |
| 6,827,966 B2 | 12/2004 | Qiu et al. | |
| 6,878,767 B2 * | 4/2005 | Kenig | 524/444 |
| 7,045,087 B2 | 5/2006 | Kotov | |
| 7,329,415 B2 | 2/2008 | Lally et al. | |
| 7,438,953 B2 | 10/2008 | Kotov et al. | |
| 7,534,610 B1 | 5/2009 | Kotov et al. | |
| 7,666,461 B2 | 2/2010 | Qiu et al. | |
| 7,763,715 B2 | 7/2010 | Hecht et al. | |
| 7,863,038 B2 | 1/2011 | Motamedi et al. | |
| 7,897,876 B2 | 3/2011 | Tsotsis et al. | |
| 7,901,706 B2 | 3/2011 | Lally et al. | |
| 8,080,183 B2 | 12/2011 | Kotov et al. | |
| 8,159,235 B2 | 4/2012 | Lynch et al. | |
| 8,318,859 B2 | 11/2012 | Amano et al. | |
| 2002/0139268 A1 * | 10/2002 | Emery et al. | 101/425 |
| 2003/0021982 A1 | 1/2003 | Kotov | |
| 2003/0027011 A1 | 2/2003 | Kotov et al. | |
| 2005/0008676 A1 | 1/2005 | Qiu et al. | |
| 2005/0013775 A1 | 1/2005 | Kotov | |
| 2006/0090271 A1 | 5/2006 | Price et al. | |
| 2006/0240727 A1 | 10/2006 | Price et al. | |
| 2006/0240728 A1 | 10/2006 | Price et al. | |
| 2007/0003595 A1 | 1/2007 | Wang et al. | |
| 2007/0023957 A1 | 2/2007 | Kotov et al. | |
| 2007/0224264 A1 | 9/2007 | Antipov et al. | |
| 2009/0041825 A1 | 2/2009 | Kotov et al. | |
| 2009/0121872 A1 | 5/2009 | Lynch et al. | |
| 2010/0098902 A1 | 4/2010 | Kotov et al. | |
| 2010/0248361 A1 | 9/2010 | Lasky et al. | |
| 2010/0273667 A1 | 10/2010 | Kotov et al. | |
| 2011/0186685 A1 | 8/2011 | Tsotsis et al. | |
| 2011/0250427 A1 | 10/2011 | Kotov et al. | |
| 2012/0156389 A1 | 6/2012 | Kotov | |
| 2012/0276278 A1 | 11/2012 | Qiu et al. | |

FOREIGN PATENT DOCUMENTS

| | | |
|---|---|---|
| WO | WO 03/001575 | 1/2003 |
| WO | WO 2009/062146 | 5/2009 |
| WO | WO 2011/026104 | 3/2011 |

OTHER PUBLICATIONS

Chiarelli, P.A., et al., "Controlled Fabrication of Polyelectrolyte Multilayer Thin Films Using Spin-Assembly," Advanced Materials, vol. 13, No. 15, pp. 1167-1171 (Aug. 2001) (published online Aug. 6, 2001) (Abstract only).

Cho, J., et al., "Fabrication of Highly Ordered Multilayer Films Using a Spin Self-Assembly Method," Advanced Materials, vol. 13, No. 14, pp. 1076-1078 (Jul. 2001) (published online Jul. 12, 2001) (Abstract only).

Decher, Gero, "Fuzzy Nanoassemblies: Toward Layered Polymeric Multicomposites," Science, vol. 277, No. 5330, pp. 1232-1237 (Aug. 29, 1997).

Krogman, K.C., et al., "Automated Process for Improved Uniformity and Versatility of Layer-by-Layer Deposition," Langmuir, vol. 23, No. 6, pp. 3137-3141 (2007) (published online Feb. 9, 2007).

Tomita, Shigeru, et al., "Layer-by-layer assembled thin films composed of carboxyl-terminated poly(amidoamine) dendrimer as a pH-sensitive nano-device," Journal of Colloid and Interface Science, vol. 326, No. 1, 35-40 (Oct. 1, 2008) (published online Jul. 3, 2008) (Abstract only).

Wong Shi Kam, Nadine, et al., "Electrical Stimulation of Neural Stem Cells Mediated by Humanized Carbon Nanotube Composite Made with Extracellular Matrix Protein," Nano Letters, vol. 9, No. 1, pp. 273-278 (2009) (published online Dec. 23, 2008) (Abstract only).

Earle, Martyn J., et al., "Diels-Alder reactions in ionic liquids. A safe recyclable alternative to lithium perchlorate-diethyl ether mixtures," Green Chemistry, 1, pp. 23-25 (1999).

Gordon, Charles M., "New developments in catalysis using ionic liquids," Applied Catalysis A: General, vol. 222, Nos. 1-2, pp. 101-117 (Dec. 2001).

Hagiwara, Rika, et al., "Room temperature ionic liquids of alkylimidazolium cations and fluoroanions," Journal of Fluorine Chemistry vol. 105, No. 2, pp. 221-227 (Sep. 2000).

International Search Report and Written Opinion of the International Searching Authority issued on May 30, 2011 in PCT International Application No. PCT/US2010/047313 (published as WO 2011/026104) (related to U.S. Appl. No. 13/393,341).

International Preliminary Report on Patentability issued on Mar. 6, 2012 in PCT International Application No. PCT/US2010/047313 (published as WO 2011/026104) (related to U.S. Appl. No. 13/393,341).

* cited by examiner

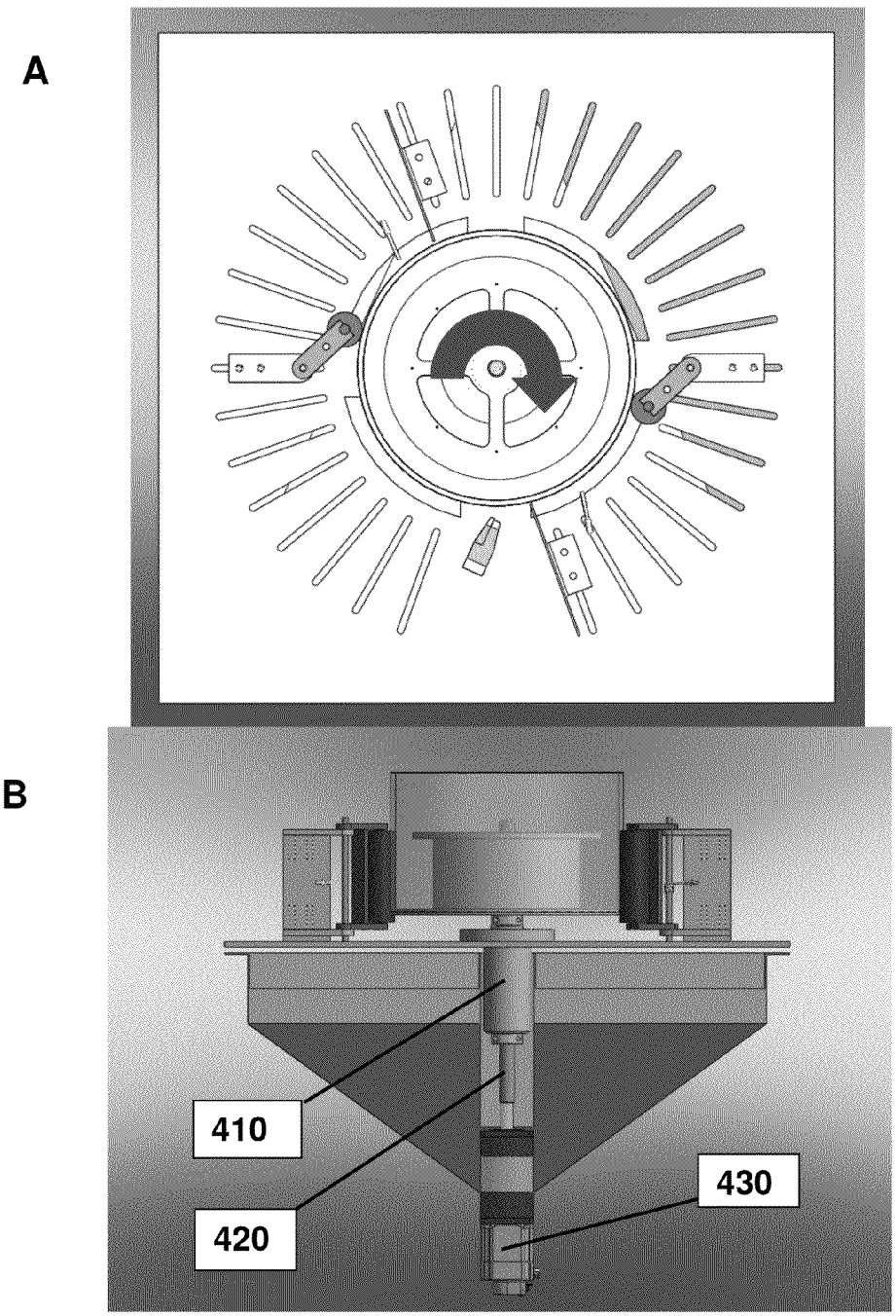
FIGURE 4 A & B

# US 8,794,175 B2

ROLLING CONTACT LAYER-BY-LAYER ASSEMBLY

CROSS-REFERENCE TO RELATED APPLICATIONS

This application claims the benefit of U.S. Provisional Application No. 61/200,786, filed on Dec. 3, 2008. The entire disclosure of the above application is incorporated herein by reference.

FIELD

The present disclosure relates to a rolling contact layer-by-layer (LBL) assembly device and methods for automated manufacture of nanocomposite films and other LBL structures.

INTRODUCTION

This section provides background information related to the present disclosure which is not necessarily prior art.

Layer-by-layer assembly (LBL) is a method of thin film deposition which is often used for oppositely charged polymers or polymers otherwise having affinity and has recently been applied to the preparation of thin films of nanoparticles. Its simplicity and universality, complemented by the high quality films produced thereby, make the layer-by-layer process an attractive alternative to other thin film deposition techniques. LBL can be applied to a large variety of water-soluble compounds and is especially suitable for the production of stratified thin films in which layers of nanometer thickness are organized in a specific predetermined order.

Typically, LBL films are assembled on a solid substrate material such as a glass slide or silicon wafer. Deposition of the film material onto the substrate is performed in a cyclic manner, made possible by the overcompensation of surface charge which often takes place when polyelectrolytes and other high molecular weight species are adsorbed on a solid-liquid interface. As used herein, a "high molecular weight" material refers to polymers, including proteins, nanoparticles, exfoliated clays, and other organic and inorganic species, having a molecular weight greater than about 1,000 atomic units. In one example of a LBL assembly process, after preparation of the substrate, a film is deposited on the substrate by repeating the process of: 1) coating or loading of the substrate with a first solution of polyelectrolyte using a roller; 2) washing with neat solvent; 3) coating or loading of the substrate with a second solution of polyelectrolyte using the same or different roller to form a plurality of bilayers on the substrate; and 4) removing the film of bilayers from the substrate. The coating or loading of solution with rollers is repeated as many times as necessary, depending on the number of layers required in order to obtain the specific properties of the desired LBL material.

The traditional method of producing these films is by routinely dipping a negatively charged substrate into charged polyelectrolyte solutions. First, the substrate is dipped into a positively charged polyelectrolyte. After rinsing with water, the substrate is dipped into a compatible and oppositely charged second polyelectrolyte solution creating a new layer of polyelectrolyte. The whole cycle is repeated from 10-500 times to create an LBL film. An example of the process uses a dipping method and the NanoStrata device (nanoStrata Inc. Tallahassee, Fla.) which can be slow and results in a small film size. Other semi-automated methods include the Spin-Grower™ (Absolute Nano, Amherst, N.H.). This process reduces the assembly time because it applies the solutions to a rapidly spinning substrate. Overall, such manual and semi-automated methods do not reliably produce films having equally distributed solutions and therefore have irregularities in film depth and structure. These methods can also suffer from errors in the handling of liquid containers and glassware that can result in failed manufacturing runs and broken glassware. Moreover, using such semi-automated methods results in film size restrictions, usually limited to the size of common laboratory microscope glass slides.

It is thus an object of the present technology to provide a device for the automated application of one or more polyelectrolyte solutions to a continuously moving substrate using an automated LBL process.

It is another object of the present technology to provide a method for the automated synthesis of thin films and other nano-composite materials having the advantageous characteristics of manually formed LBL films that can be performed rapidly and with a high degree of reproducibility.

It is yet another object of the present technology to provide a method for the assembly of free-standing thin film materials which permit the incorporation of biological compounds into the film or nano-composite structure while retaining the biological activity of the compounds.

SUMMARY

This section provides a general summary of the disclosure, and is not a comprehensive disclosure of its full scope or all of its features.

Aspects of the present technology are drawn to and/or employ a rolling contact layer-by-layer assembly device comprising at least one roller, a cylinder substrate and a motor to rotate the cylinder substrate. The assembly device may include at least one rinsing nozzle and may include an air applicator. The rollers each provide a polyelectrolyte solution to the surface of the cylinder substrate, the polyelectrolyte solutions having an affinity for each other. Excess polyelectrolyte solution can be washed using the rinsing nozzle followed by a drying step prior to the application of the second polyelectrolyte solution. A plurality of bilayers is produced by the continuous application of polyelectrolyte solutions to form an LBL article such as a nano-composite article or film. The film is then removed from the surface of the cylinder substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a perspective view of a rolling contact layer-by-layer assembly device in accordance with the present technology.

FIG. 2 panel A shows an exploded perspective view of a cylindrical substrate and top and bottom wheels, which along with a center cylinder, form a rim assembly. Panel B is a photograph of a rubber tube inflated between the rim assembly and cylindrical substrate.

FIG. 3 panel A shows a perspective view of a roller assembly connected to a mounting assembly. Panel B shows the roller assembly with a solution liquid applicator in place.

FIG. 4 panel A shows a plan view of the rolling contact layer-by-layer assembly device indicating rotation direction of the cylindrical substrate and relative position of the rollers in contact with the cylindrical substrate. Panel B shows a side elevation view of the rolling contact layer-by-layer assembly device in accordance with the present technology. Panel C shows a side cross-sectional view of the rolling contact layer-by-layer assembly device. And panel D shows a perspective view of a mounting plate and drive shaft of the rolling contact layer-by-layer assembly device.

DETAILED DESCRIPTION

Figure 1:
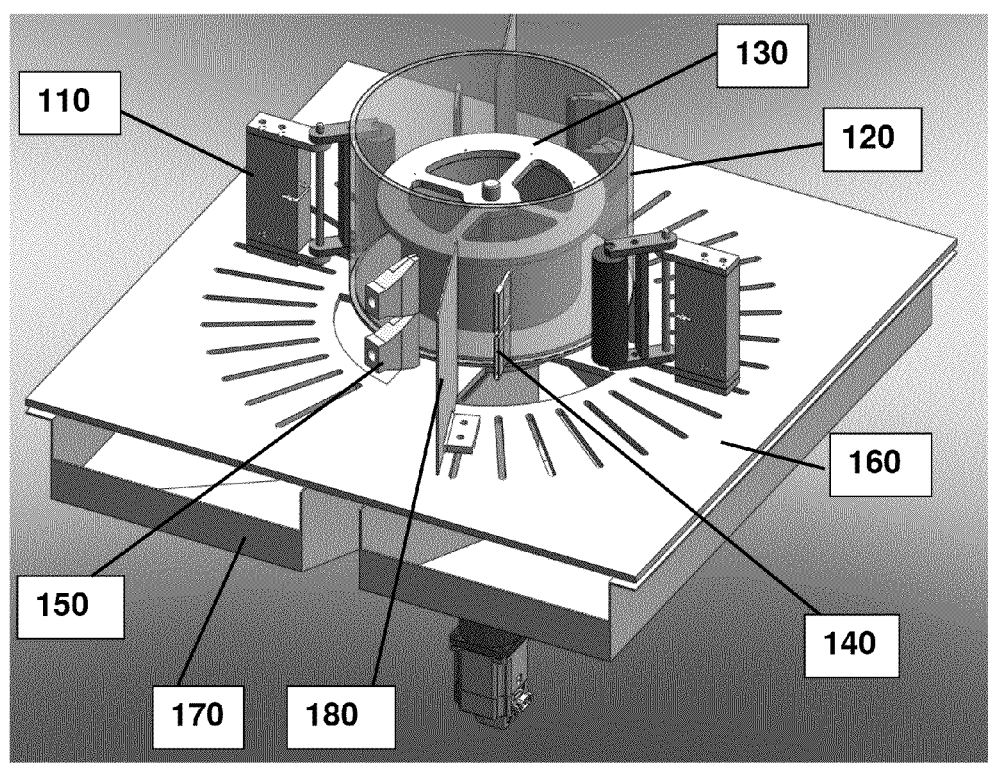

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

The present technology relates to loading one or more solutions onto a substrate in order to form a layer-by-layer (LBL) article using a rolling contact layer-by-layer assembly device. For example, polyelectrolyte solutions of alternating charge can be loaded onto a substrate to form an LBL article.

Layer-by-layer assembly can produce multilayered nanocomposite films by layering a charged solution and an oppositely charged solution, where such solutions may include polyelectrolytes and/or nanocolloids. LBL assembly has many advantages including simplicity, versatility, and thickness control on the nanoscale. And due to the simplicity of the method, there are a wide variety of ways to apply it. Methods have included dip-coating processes that create layers by dipping a substrate into oppositely charged solutions to build bi-layers. Films can also be created with spin-assisted LBL, where solutions are injected onto a spinning substrate.

The present technology provides assemblies and methods of using the assemblies that produce LBL articles while reducing the cycle time and allow for creating larger films. The present assemblies can be employed in a novel roll-printing method to apply oppositely charged solutions to a rotating drum. The drum rotates while rubber rollers are coated with a charged solution which is then transferred onto the substrate, reducing time and creating larger films compared to other methods. The device can be used to produce large films and has the potential to be adapted for many applications.

The present technology can be compared to dip-coating and spin-coating methods. The dip-coating method creates layers by routinely dipping a negatively charged substrate into a positively charged polyelectrolyte solution. After rinsing with water, the substrate is dipped into a negatively charged nanocolloid creating a new layer. The whole cycle is repeated from 200 to 300 times in order to create a thin film, which can sometimes take over two days to complete. This is a sound, simple method, but it also has several problems including size limitations and long assembly times, due to the slow adsorption rate. The resulting films are of good quality, but the size of the films is limited by the small substrates and dipping reservoirs. This method can often take up to several days to produce a single film.

Another method is based on a spin-coating process which can dramatically reduce the cycle time compared to dip-coating. Here, a substrate spins-horizontally while the solution is dripped over it. Centrifugal forces significantly reduce the adsorption rate. The process constructs layers at a faster rate than the dip-coating device, but does not entirely eliminate the size dilemma of the films that can be fabricated.

The present roll-to-roll methods use rollers to apply a layer of solution with relative speed and efficiency. Rolling proves to be a valuable method for applying a liquid to a substrate. The forces from physical contact create a vacuum that removes the solution from the roller so that it can adhere to the surface of the substrate. The present technology takes advantage of these aspects of roll-to-roll methods.

The rolling contact layer-by-layer assembly device uses one or more roller assemblies to deliver solutions, such as polymer and/or nanocolloid solutions, to a cylindrical substrate. As the cylinder rotates, excess solution is rinsed off with deionized water, which can be delivered through wide nozzles on flexible arms from peristaltic pumps. After the rinse, air-knives can be used to blow the rinse solution off of the cylinder with pressure-controlled air from regulators mounted to an in-house air supply or compressor.

The solution is applied to the substrate using a roller assembly. A soft, rubber roller is held in contact with the substrate by an adjustable torsion spring. One or more solutions can be dripped vertically down the roller, which are then applied it to the substrate as the roller rotates against the substrate. Fluid can also be delivered to the rollers using one or more variable-speed Stenner 85 MPH40 peristaltic pumps, which can also be used to control the flow rates of the solution. The roller assembly can be machined and assembled using various materials, including 6061 aluminum and polyethylene.

The roller assemblies are attached to the mounting plate. The mounting plate can be made with ¼" 6061 Aluminum and cut using a water jet. Radial slots can allow for placement adjustability of the roller assemblies. The water lines and the air knives can be attached to the mounting plate using NPT adapters. They will be attached to supply lines from the pumps or the regulators, respectively. Water can be supplied using Anko Series 4000 peristaltic pumps. Bolted to the mounting plate is a structural tube, which holds and supports the drive shaft. This transmits the weight of the substrate to the mounting plate. The structural tube also prevents fluids from entering the motor, which is situated directly under it.

Under the mounting plate sits a drip pan which collects the excess fluid that seeps through the mounting plate. It can be made from an aluminum sheet and bent and welded into form. The drip pan can slide out for easy cleaning.

Supporting the substrate is the rim assembled from a bottom disk or wheel with a lip, an inner cylinder spacer, and a top disk or wheel. The rim can be machined out of 6061 Aluminum using a water jet. Since the driveshaft can have a D profile, the rim can have similarly shaped holes on its top and bottom plates to transmit the torque from the motor generating the rotation of the substrate. Between the disks and around the cylinder will be an inner tube that upon inflation will press against the cylindrical substrate, creating enough friction so that the cylindrical substrate spins with the rim. Proper alignment is essential for proper film growth. Uniformity is determined by consistent pressure applied to the substrate. Any misalignment will alter the pressure applied throughout rotation, creating inconsistent films on the substrate. In the device, a motor is used that is capable of accurately controlling the speed of the substrate so that the rollers apply the solution at the desired rate.

For the inside of the device, materials are used that can withstand a pH range of 4 to 10 as the parts may be in contact with the charged solution for the entire assembly time. An important characteristic of the materials for the device is the ability to resist acidic and basic solutions. Aluminum 6061 can be used as it is resistant to acids and bases and is easily weldable and readily available. For the roller assembly, the material should be flexible so that the roller shaft can snap into place and be held without any other hardware. For example, the roller can be made of polyethylene (High Density Ultra High Molecular Weight) because it has a small Young's modulus and a relatively high Fracture toughness so that it resists the propagation of a crack. Durability can be important as the roller may go large under a number of loading cycles from placing and removing the roller.

For the device to work properly the peristaltic pumps need to be calibrated. For example, the pumps used can deliver between about 10 mL/min to about 30 mL/min.

The film-coated substrate can be dried using an air-pressure of about 10 psi. The pressure may need to be adjusted on the regulator depending on the particular film. To increase assembly speed, the air-pressure can be increased to ensure proper drying.

The cylindrical substrate can be wrapped with a cellulose acetate film on the portion where the charged solutions will be applied. This will make the LBL film product easier to remove from the substrate. The device can be used to create films with an identical number of bilayers, for example from 2 layers, to dozens or hundreds of layers or more.

The rolling contact layer-by-layer assembly device uses a roll-printing method to consecutively apply oppositely charged solutions to a rotating drum. The cylindrical substrate drum rotates while a solution is applied between the drum and the roller, where the roller spreads the solution evenly across the substrate. This reduces time through continuous application and creates larger films compared to other methods. The rolling rate needed for proper adsorption can decrease LBL assembly time drastically compared to both dip and spin-LBL methods. This can accelerate the pace at which nanocomposite films are created. The rolling contact layer-by-layer assembly device can produce larger films than both previous methods and can be scaled to include large substrates, making it easily adaptable for commercial applications. The increase in production rates with the increase in film size can be used to form new nanocomposites with unique properties.

Referring now to FIGS. 1-8, the rolling contact layer-by-layer assembly device can include a cylindrical substrate operable to support a linear or curved substrate onto which a plurality of polyelectrolyte layers alternating in charge can be applied.

An automated rolling contact layer-by-layer assembly device is illustratively shown in FIG. 1 and represents only one of many possible embodiments and is not meant to be limiting. The automated LBL device utilizes one or more roller assemblies 110 to deliver the first and second polyelectrolyte solutions to a cylindrical substrate 120, such as a glass cylinder. The cylindrical substrate can be made of any chemically compatible glass, quartz, plastic or other suitable inert material as known in the art. The cylindrical substrate 120 and rollers 110A (part of roller assemblies 110) are dimensioned such that both have tubular cross-sections. As the cylindrical substrate 120 rotates about a given axis coupled to a rim assembly 130, the excess polyelectrolyte solution is rinsed off with de-ionized water, which is delivered through water nozzles 140. The rim assembly 130 is driven by driveshaft coupled to a motor (not shown). After the liquid rinse, air-knives 150 blow the rinse solution off of the cylindrical substrate 120. The roller assemblies 110 are coupled to a mounting plate 160 using one or more slots that allow adjustment of the position of the roller assemblies 110. The mounting plate 160 also has a cutout where a driveshaft from a motor (not shown) passes through and is coupled to the rim assembly 130. A drip plate 170 is located below the mounting plate 160 to catch rinse water from the water nozzles 140 that may include excess solution applied by the roller assemblies 110. One or more shields 180 can be used to prevent air flow from the air-knives 150 from interfering with the rinse action of the water nozzles 140.

The components described above are supported by the following four systems: a solution delivery system, a rinse water delivery system, an air supply system, and a substrate mounting/moving system. These four systems can be manually programmed or alternatively, controlled by either a computer program interface (e.g., LabView from National Instruments Corp., Austin, Tex.) or direct user input.

Figure 2:
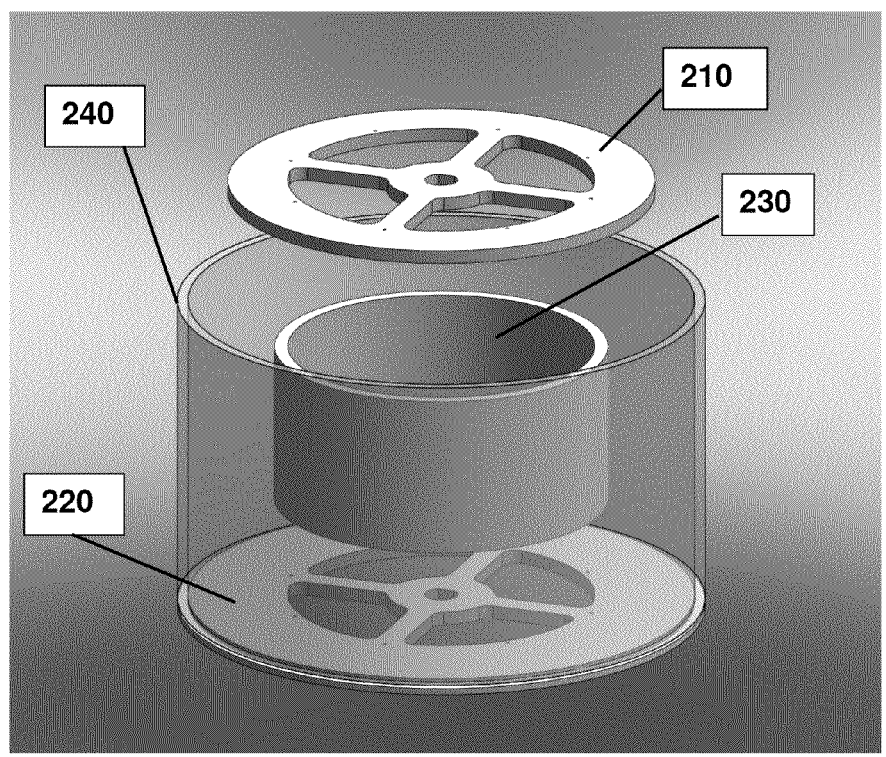
Figure 2B:
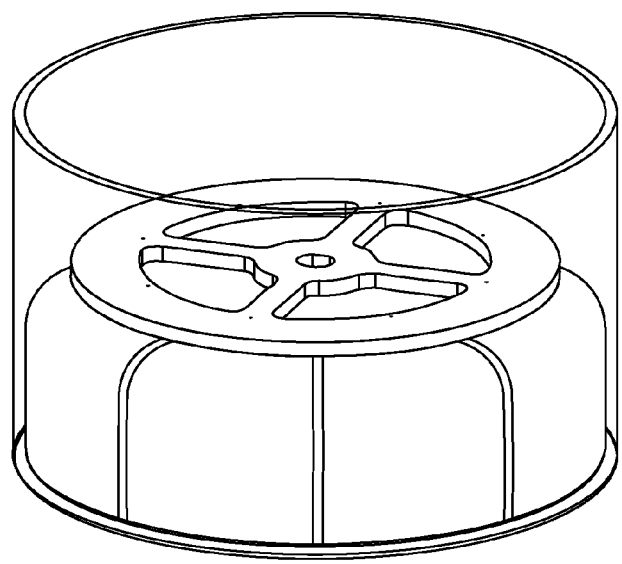

As shown in FIG. 2, a top wheel 210, a bottom wheel 220, and a center cylinder 230 are welded together, forming a solid rim to attach to a driveshaft. The vertical weight of the cylinder is supported by the bottom wheel 220. An inflatable rubber tube is disposed about the rim so that it is between the rim and the cylindrical substrate 240. When the rubber tube is inflated, it presses on the cylindrical substrate 240 and the rim where friction holds it in place, which allows the cylindrical substrate 240 to rotate with the rim as powered by the driveshaft. Panel B of FIG. 2 is a photograph of the rubber tube inflated between the cylindrical substrate 240 and rim.

In some embodiments, once the desired number of layers of polyelectrolyte solutions is applied by the rolling contact layer-by-layer assembly device for the desired film type, the LBL nano-composite film can be detached from its supporting cylindrical substrate. Any method for separating a film from a substrate can be used. Preferred methods include those disclosed in PCT patent publication No. WO 01/72878. For example, a substrate can be removed by dissolving it in an organic solvent. A silicon wafer or glass substrate can be partially or completely dissolved by HF. Alternatively, a substrate can be removed through other chemical treatment, heat treatment, pH change, ionic strength change, or other means suitable to achieve the appropriate separation. For example, the film may be connected a substrate through a special sacrificial stratum, which can be decomposed by a chemical or photochemical means. In particular, the cylindrical substrate can be wrapped with a removable film, such as a cellulose acetate film, which can be dissolved with solvent to facilitate removal of the produced LBL film from the cylinder.

Referring now to FIGS. 3A and 3B, a roller assembly 310 is shown. The roller 310 is held by a roller arm 320 which is resiliently held in contact with the substrate by a torsion spring 330. The force applied to the cylinder by the roller 310 can be adjusted in two ways. The torsion spring 330 can have the preload adjusted on the roller assembly using a set screw in a torsion spring adjustment slot 350 and the entire roller assembly 310 can also be adjusted by moving the assembly radially on the mounting plate. The roller assemblies 310 can be mounted to the mounting plate in slots, which allow the roller assembly to be moved closer or further away from the substrate (see FIG. 1). This motion, along with the adjusting set screw in the torsion spring adjustment slot 350, allows the force between each roller and the substrate to be changed by changing the amount of spring deflection. The one or more roller assemblies 310 are used to apply the polyelectrolyte solutions/colloids to the substrate.

Figure 3:
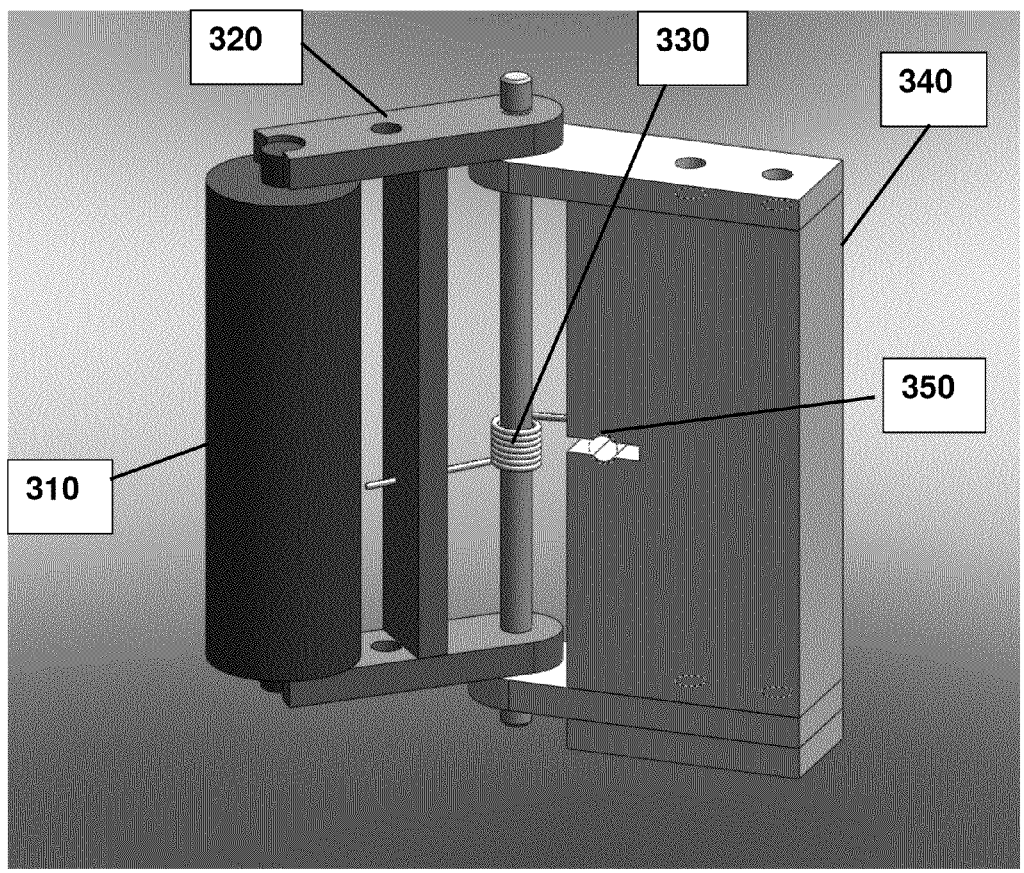
Figure 3:
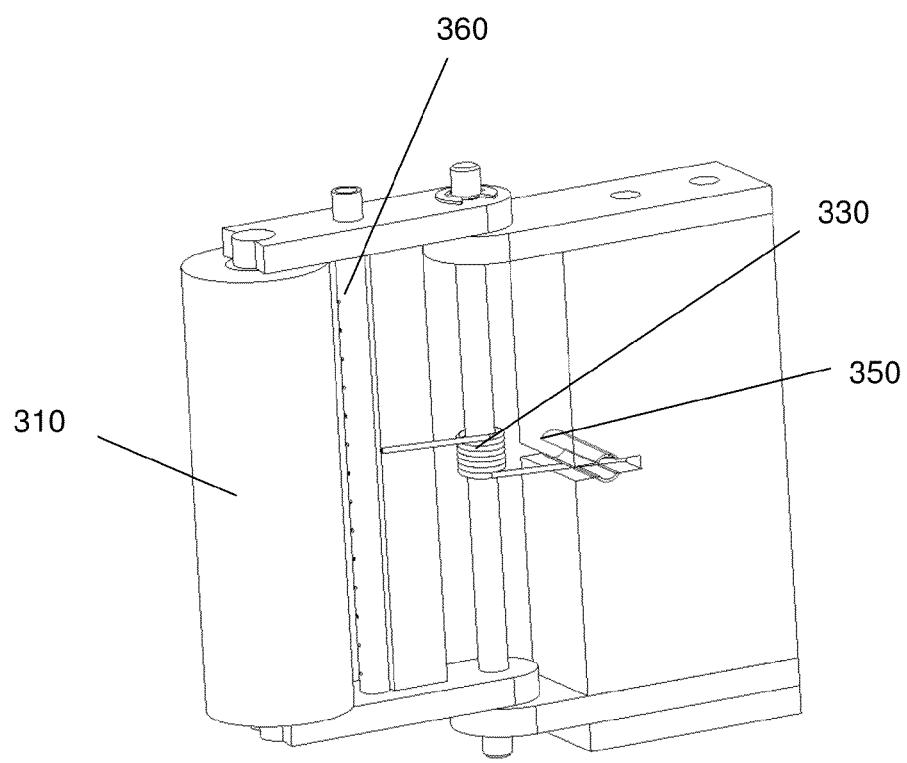

The application of one or more solutions to the roller is illustratively shown in FIG. 3 panel B. The roller 320 can be coated with the solution by a foam applicator (not shown). A tube 360 can be disposed along the full height of the roller. The tube 360 can have many small perforations/openings on the roller side to allow solution to flow through. A strip of foam is attached to the tube and makes contact with the roller. As the solution flows through the tube 360 and out the perforations/openings, the solution saturates the foam against which the roller spins, so that the solution can be deposited on the roller. The solution can be supplied to the tube 360 by peristaltic pumps or other methods of liquid displacement.

Polyelectrolyte solution can be applied to the roller via saturated foam positioned between the roller and the dispensing tube. The tube can have many small holes spaced evenly along it to ensure an even distribution of solution throughout the foam. For example, fluid can be delivered to the roller assembly through Bioprene tubing using Watson-Marlow 313VDL/D Variable speed peristaltic pumps. These pumps can receive input from a DC power supply and a DAQ board connected to a computer LabView program. The specific flow rates of the solution can be controlled using the computer program. Bioprene tubing of $\frac{1}{16}$ inch diameter can be used to allow for about 5 mL/min to about 200 mL/min of solution to be delivered to the roller.

The rinse water delivery module can include one or more cylindrical tubes capable of carrying a flow of liquid. In some embodiments, the tubes can be conformable and malleable, for example Loc-Line tubes and nozzles. These tubes allow many degrees of freedom for the positioning of the rinsing streams of de-ionized water onto the substrate. By using acid resistant parts, all the components of the rinse water delivery system can be tolerant to the working conditions in the present automated LBL device assembly. The diameter of the tubing used for liquid rinse application to the substrate can range from about 0.5 cm to about 5.0 cm, preferably from about 1.0 cm to about 2.0 cm.

In some embodiments, the liquid used in the rinse water delivery module can include any chemically compatible liquid which does not adversely affect the formation of the polyelectrolyte bilayers in the LBL film. In some embodiments, de-ionized water can be used. The de-ionized water supplied to the tubing components can be delivered through $\frac{5}{16}$" ID bioprene tubing and pumped using Watson-Marlow 313VDL/D Variable speed peristaltic pumps. These pumps will be controlled in the same manner as the other peristaltic pumps. An in-house deionized water supply can be used to supply the pump or a reservoir of water can be used.

Referring again to FIG. 1, the rinse water drains down through the mounting plate 160 which has one or more apertures perforating the mounting plate for liquid drainage. Underneath the mounting plate is a drip plate 170 which includes an angled surface to collect the waste solution where it can be drained through a hose to a waste container. The drip plate 170 can be easily removable for cleaning as it can be configured to ride on a sliding track on a frame. The drip plate 170 may need to be washed between uses to prevent buildup of waste material and so the roller assemblies can be adjusted or removed easily.

The drying of the applied film, although optional for the formation of an LBL nano-composite film, can be done using an air flow, for example as provided by one or more miniature air knife nozzles attached to flexible and adjustable piping (e.g., stay-set hose from Exair Corp., Cincinnati, Ohio) or the nozzles may be coupled to the mounting plate. The nozzles can be adjusted in position relative to the substrate so that the optimum drying time and air flow are achieved which decreases the completion time for a particular film of a desired thickness. In some embodiments, the flow of air can be manually controlled, since it may only require a constant pressure once the machine is turned on. Therefore, the input air can be controlled with an inline pressure regulator for each side of the device. The present device can be fitted with in-house air lines or can be attached to an air compressor to provide the stream of air, where the stream of air may also be heated to a temperature ranging from about 10° C. to about 90° C. to facilitate drying, depending on the heat labile nature of the film and the bilayers formed on the cylinder substrate. In an illustrative embodiment, a stay-set hose accompanying the air nozzles can have a ¼" NPT threading on the end, so it can be threaded into a mounting plate and supplied by a connection from underneath.

The rim assembly, shown in FIG. 2, supports the cylinder substrate 240. Vertically, the cylinder substrate 240 can be supported by a lip on the bottom wheel 220. The rim assembly slides onto the drive shaft from above and rests on a collar (not shown). In some embodiments, the driveshaft can have a D profile where the rim can also have similarly shaped holes on its top and bottom wheels 210, 220 to transmit the torque from the motor generating the rotation of the substrate. The inner tube pictured FIG. 2 panel B holds the cylinder substrate 240 so that it rotates with the rim. Power can be transmitted to rotate the cylinder substrate through a step motor, which can be geared down to increase torque and decrease irregularities, for example, as caused by the steps in a CGI gearbox with a 55:1 gear ratio. The gearbox shaft can be coupled to a ⅝" driveshaft, for example.

Figure 4:
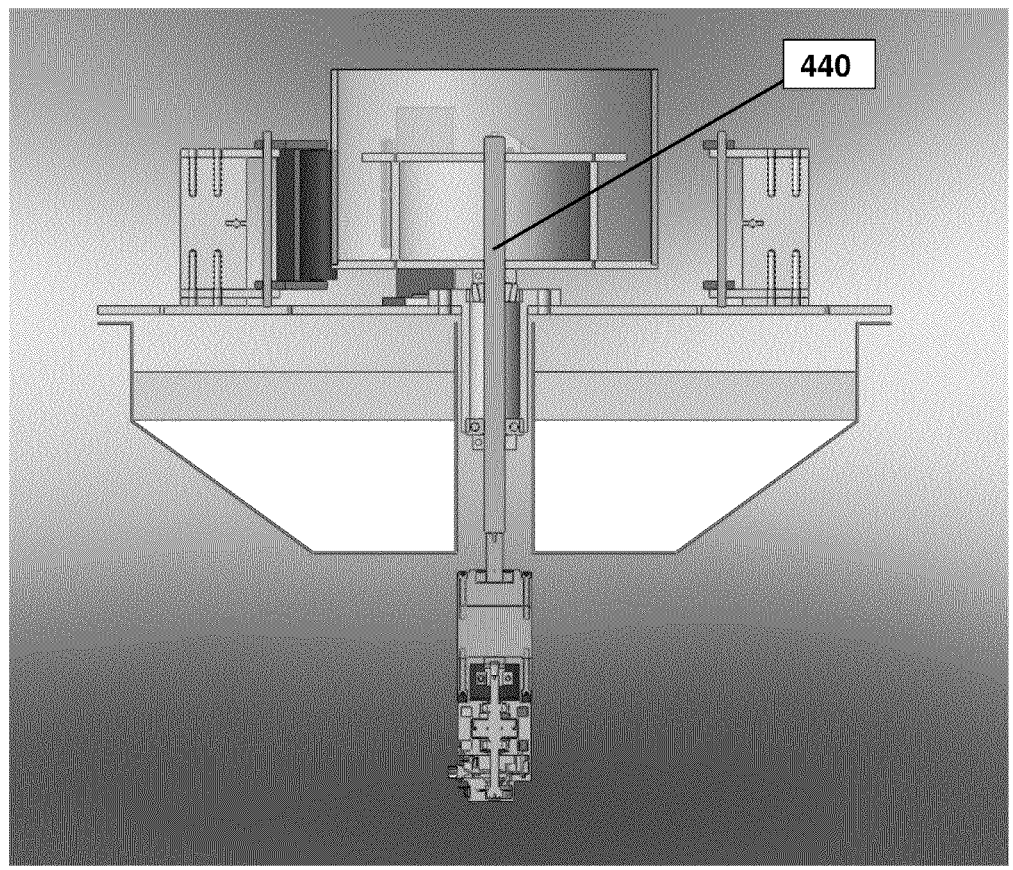
Figure 4:
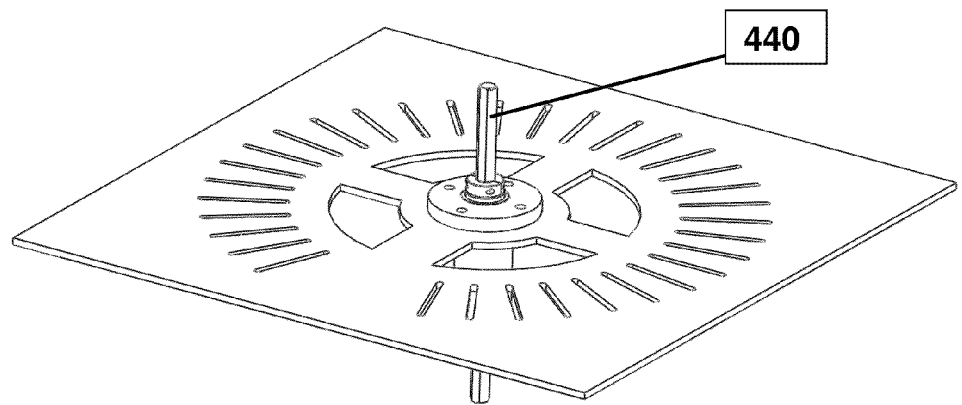
Figure 5:
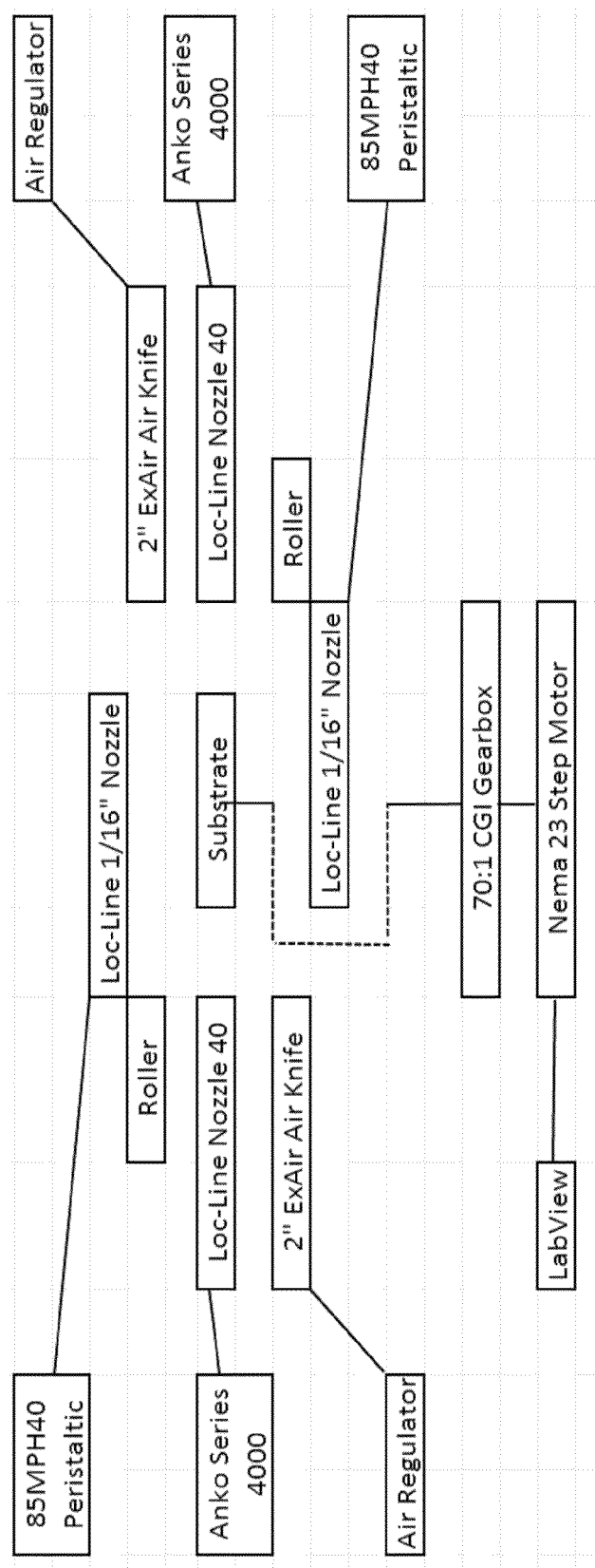
FIG. 5 shows a block diagram illustrating assemblage of components of a rolling contact layer-by-layer assembly device.

Referring now to FIG. 4 panels A, B, C and D, panel A shows a top view of the rolling contact layer-by-layer assembly device as shown in FIG. 1, where rotation direction of the cylindrical substrate is indicated by the arrow. Rotation is supplied by a driveshaft 440 that can be supported by one or more bearings in a structural tube 410. An angled roller bearing in the top of the structural tube resists axial motion, and the top bearing and a roller bearing in the bottom of the structural tube can also absorb moments. These bearings can be spaced from 1 to 8 shaft diameters apart to handle the loads placed upon them. Collars on the shaft on each side of the structural tube can be operable to restrict axial motion of the shaft. In some embodiments, the substrate's weight and forces which the substrate may impose on the driveshaft 440 can be transferred to the mounting plate through the structural tube. This can be beneficial because it decreases the stress on the coupled driveshaft 440 and the motor mount. The motor 420 (e.g., a DC stepper motor) is coupled to the structural tube 410 by a shaft coupler 430. The motor 420 also connects directly to a computer and can be controlled by a program such as LabView with user input. A DC power supply can be used to power the motor 420.

The present technology includes methods of using the rolling contact layer-by-layer assembly device to form a nanocomposite film. The present automated LBL device overcomes the inherent problems associated with manual and semi-automated film forming methods described above. The methods of the present disclosure include placing a substrate on the cylindrical substrate for commencement of the layer application. In some embodiments, the film produced can be directly applied onto a cleaned glass cylindrical substrate or preferably a removable substrate mounted onto the glass cylindrical substrate, for example a soluble cellulose acetate film that can be chemically dissolved after the film has been produced thereon.

The glass cylindrical substrate can be cleaned using a variety of compatible glass cleaners. For example, the glass surface can be thoroughly cleaned in hot $H_2O_2/H_2SO_4$ (1:3) mixture for 5 minutes. The cylinder substrate can be made of glass, plastic, ceramic, metal and any solid material that can be fastened to the rim assembly of the device. Alternatively, the substrate can also include an additional layer that is mounted onto the glass cylinder substrate. The mounted substrate can also be made from soluble or non-soluble materials including glass, inert polymers, plastic, silicon, ceramic and metal. Subsequent to drying, a few drops of 15% solution of cellulose acetate in acetone can be applied to the surface of the substrate and allowed to spread forming a uniform coating. The substrate can be immediately placed in a desiccator and the solvent can be allowed to slowly evaporate. The substrate can also include a soluble substrate such as a cellulose-based product that can be readily dissolved in an appropriate solvent.

The substrate can be placed around the contact surface of the glass cylinder substrate. In some embodiments, the substrate on which the LBL film or structure is manufactured using the present method can vary in size ranging from any dimension capable of being attached to or created on the glass cylinder, or alternatively, a flexible substrate can be continuously fed around the glass substrate cylinder.

Once the substrate is ready for processing, the polyelectrolyte solutions can be applied in an alternating fashion using at least two roller assemblies, each fed with one of the polyelectrolyte solutions. Once the cylindrical substrate commences rotation, the roller assembly can be actuated to contact the glass cylindrical substrate or a material placed on top of the cylindrical substrate; e.g., cellulose acetate film. The rotational speed of the cylindrical substrate can be adjusted as needed to achieve a uniform application of solution from the roller assembly. Having the substrate rotate continuously during the polyelectrolyte application advantageously speeds up the LBL process to enable significant reductions in time of manufacture.

In some embodiments, the rotating cylindrical substrate is contacted with one or more rollers where each roller is capable of applying a predetermined volume of polyelectrolyte solution to ensure uniform coverage of the solution over a substantial portion of the substrate surface. While it is preferred that each polyelectrolyte solution be dispensed from a single roller assembly, it can be envisioned that a single roller can be used to dispense the two polyelectrolyte solutions and optionally a wash solution in between the application of each polyelectrolyte. Preferably however, the method entails two rollers each having a different polyelectrolyte solution such that the two polyelectrolyte solutions are chemically attracted to each other through covalent, hydrogen, dipole, ionic or Van der Waal forces. While each roller may apply sufficient polyelectrolyte solution on the surface of the substrate by placement of the two rollers at an equal distance apart on the mounting plate, the substrate is preferably rinsed with a compatible rinsing solution, for example water. The use of a rinsing step is optional, since the amount of polyelectrolyte applied may be sufficiently small to uniformly cover a substantial surface of the substrate without leaving any excess polyelectrolyte solution. Moreover, if there is an air nozzle placed between the two roller assemblies to dry the substrate, it may be optional to rinse the coated substrate after polyelectrolyte application.

The rolling contact layer-by-layer (LBL) assembly device can also optionally include one or more shields 180 or partition walls between the optional rinse nozzles and air nozzles, as illustrated in FIG. 1. In some embodiments, after the first polyelectrolyte has been applied, the next sequence is a rinse sequence, followed by a drying sequence with the use of air nozzles which can be spaced between a roller assembly and rinse nozzles. The amount of air required to satisfactorily dry the wetted substrate or film can vary according to the rotational speed of the cylinder substrate, the viscosity of the rinse liquid or polyelectrolyte solution used to coat the substrate, and the surface activity of the solutions in contact with the developing film or substrate. The amount of rinse liquid and air for rinsing and drying respectively can be empirically determined.

In some embodiments, the LBL film or nano-composite structure (for example, a laminated structure or LBL coated lamina) can be formed by continuous application of bilayers comprising a first polyelectrolyte and an oppositely charged or chemically attracted second polyelectrolyte. The methods of the present technology provide simultaneous application of the two polyelectrolytes using a rotating cylindrical substrate capable of applying one complete bilayer sequence per rotation. As can be envisioned, films having anywhere from about 20 to about 500 complete bilayers can be achieved rapidly and uniformly with a concomitant reduction in operating costs and reagent waste as compared to prior manual and semi-automated methods for producing LBL films.

In some embodiments, a first aqueous solution or dispersion can include a charged material and a second aqueous solution or dispersion can include an oppositely charged material from the first solution. For example, the first and second solutions or dispersions of an electrostatically charged substance can include charged materials including one or more polyelectrolytes, natural or synthetic polymers, proteins, dyes, metal and semiconductor nanoparticles, magnetic nanoparticles, carbon nanotubes, vesicles, viruses, carbohydrates, extra cellular matrix components, e.g. collagen and laminin, DNA, RNA, and the like, including combinations thereof. The first polyelectrolyte can be either a positively charged or a negatively charged solution and the second polyelectrolyte is a chemically opposite charged or compatible species.

The electrostatic attraction between the polyelectrolyte and the substrate results in the adsorption of a layer of polyelectrolyte to the substrate. It should be understood, however, that the first substance may be one of a variety of materials, as described, having a positive electrostatic charge and contained in a solution or dispersion or otherwise having an affinity for the substrate. Due to the cyclic nature of the deposition process, the film produced in n deposition cycles is hereinafter referred to as $(PolyA^{\pm}/PolyB^{\mp})_n$. After one rotation sequence, $(Poly A/B)_1$, can result in the addition of a polyelectrolyte-bilayer with an average thickness of about 1 to about 3 nanometers, for example.

The present methods also afford greatly reduced waste in reagents. In some embodiments, the rolling contact layer-by-layer assembly of the present technology also provides a drip plate 170, illustratively shown in FIG. 1. The method for making LBL films and other LBL structures can employ a recycle step to effectively collect excess polyelectrolyte solution from the drip plate 170 and reintroduce the solution back into the process or it can be saved for later use.

In addition to reduction of reagent waste and increases in efficiency in polyelectrolyte application, the present methods using a rolling contact LBL assembly device to reduce incidental substrate damage typically found in the semi-automated methods described above. Since there are fewer moving parts, the substrate is not in danger of contacting glass beakers and other equipment as experienced with the dip-coating methods.

The rolling contact LBL assembly device reduces the film assembly time significantly, and by increasing the surface area of the substrate, the device allows a corresponding increase in the film size that can be created. Film irregularities are also minimized when using the rolling contact LBL assembly device. The parts within the device can also be easily changed and manipulated, making a more versatile machine.

Reducing the film assembly time is a challenge in forming nano-composite films and other LBL structures. The majority of the process time is contingent on solution absorption time and film drying time. The rolling contact layer-by-layer assembly device includes solutions that are applied to soft, rubber rollers that apply the solutions to a motor-driven substrate. The roller rotates due to the friction between the substrate and itself. The film can be rinsed by a stream of water that will follow the rollers and can be dried using an air knife that will blow the remaining water off of the substrate. The device is versatile in that the position and number of rollers, water streams, and air knives can be changed. The flow rate of the solutions and water and the substrate rotation speed can all be controlled, for example through a computer running the LabView program. The air velocity of the air knives can be controlled by an outside regulator.

The present devices and methods reduce product film assembly time by improving solution adsorption and film drying and allow for larger product film based on the size of the cylindrical substrate. For example, the present devices and methods can be used to fabricate product films having sizes of greater than about 50 $cm^2$ with a 300 bilayer cycle time of less than about 8 hours.

The present devices and methods utilize roller assemblies to deliver the polymer and colloid solutions to a cylindrical substrate. As the cylinder rotates the excess solution is rinsed off with de-ionized water, which is delivered through wide nozzles on flexible arms, and, after the rinse, air-knives blow the rinse solution off of the cylinder. The process described above is supported by the following four systems: solution delivery system, rinse water delivery system, air supply system, and substrate mounting/moving system.

These four systems can be controlled by a computer program interface (e.g., LabView) and/or direct user input. The design systems and the modules within the device are further described as follows.

Figure 6:
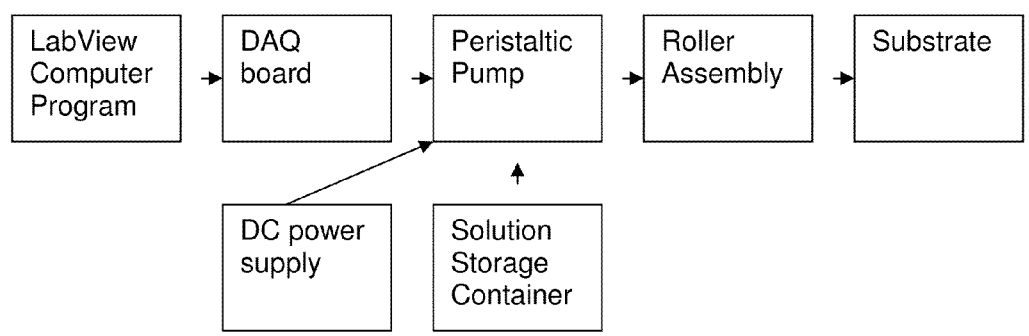
FIG. 6 is a block diagram showing the interconnection of components of the solution delivery system.

The solution delivery system includes a roller assembly, as previously shown in FIG. 3. As described, the roller is held in contact with the substrate by a torsion spring. The normal force applied to the cylinder by the roller can be adjusted in two ways. The spring can have the preload adjusted on the roller assembly, and the assembly can be adjusted radially on the mounting plate. Fluid is applied to the roller via saturated foam between the roller and the dispensing tube. The tube has many small holes spaced evenly along it to ensure an even distribution of solution throughout the foam. The method of applying the solution to the roller in this manner was shown to be effective experimentally. Fluid is delivered to the roller assembly through Bioprene tubing using Watson-Marlow 313VDL/D Variable speed peristaltic pumps. These pumps will have input from a DC power supply and a DAQ board connected to a computer LabView program. The specific flow rates of the solution will be controlled using the computer program. $1/16$ inch Bioprene tubing will be used allowing for 26-91 mL/min to be delivered to the roller. FIG. 6 is a block diagram showing the interconnection of components of the solution delivery system.

Components of the rinse water delivery system can include Loc-Line tubes and nozzles (Lockwood Products, Inc., Lake Oswego, Oreg.). These allow many degrees of freedom for the positioning of the streams of deionized water onto the substrate.

Figure 7:
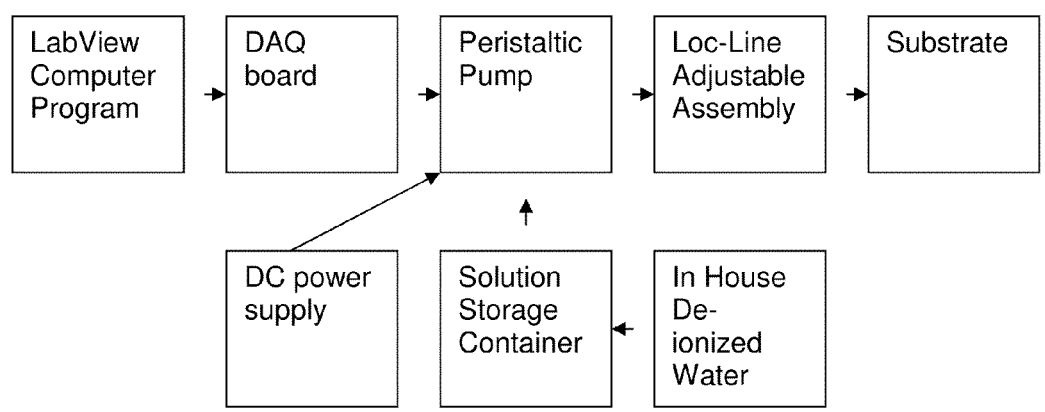
FIG. 7 is a block diagram showing the interconnection of components of the rinse water delivery system.

By using Loc-Line acid resistant parts, all the components of the rinse water delivery system will be tolerant to the working conditions in the assembly. ¼ inch LocLine tubing can be used. The LocLine ¼ inch swivel nozzle can apply water evenly onto the substrate and maximize rinse efficiency. Deionized water can be supplied to the Loc-Line components through 5/16" ID Bioprene tubing and pumped using Watson-Marlow 313VDL/D Variable speed peristaltic pumps. These pumps can be controlled in the same manner as the other peristaltic pumps. An in house deionized water supply will continually refill the 2 liter bottle which the pump uses as a reservoir. FIG. 7 is a block diagram showing the rinse water delivery system components and the connections therebetween.

The rinse water drains down through the mounting plate which has many holes in it. Underneath the mounting plate is a drip pan which is on an angle to collect the waste solution and drains through a hose in the front to a waste container. The drip pan is easily removable for cleaning because it is on a sliding track on the 80/20 frame. The hoses which will stick out the bottom of the mounting plate pass out the slot in the back of the drip pan. The drip pan is easily removable because it may likely need to be washed between uses to prevent buildup and so the roller assemblies can be adjusted or removed easily.

The air supply system can include the following aspects. Drying of the film can be done using miniature air knife nozzles on stay-set hose attached to the mounting plate. This will allow for the nozzles to be adjusted so that the optimum drying time is achieved. This system does not have computer control, since it only requires a constant pressure once the machine is turned on. Therefore, the input air will be controlled with an inline pressure regulator for each side of the device. Since the lab in which this device will be used has in house airlines we will utilize these rather than purchasing a compressor. The stay-set hose which comes with the air nozzles we have procured has ¼" NPT threading on the end, so it will be threaded into our mounting plate and supplied by a connection from underneath.

The substrate mounting/moving system can include the following aspects. The rim assembly, shown below, supports the quartz tube substrate. Vertically, the tube is supported by an ⅛" lip on the lower rim. The rim assembly slides onto the drive shaft from above and rests on a collar. Since the shaft has a D profile the rim will have similarly shaped holes on its top and bottom plates to transmit the torque from the motor generating the rotation of the substrate. The inner tube pictured in the figure below holds the substrate so that it rotates with the rim.

Power is transmitted to the substrate through a NEMA 23 step motor, which is geared down to increase torque and decrease irregularities caused by the steps in a CGI gearbox with a 55:1 gear ratio. The gearbox shaft will be coupled to the ⅝" driveshaft. The driveshaft is supported by two bearings in the structural tube. An angled roller bearing in the top of the structural tube resists axial motion, and the top bearing and a roller bearing in the bottom of the structural tube absorb moments. These bearings are spaced 4 shaft diameters apart to handle the loads placed upon them. Collars on the shaft on each side of the structural tube restrict axial motion of the shaft. This design transfers the weight and forces which the substrate may impose on the drive shaft to the mounting plate through the structural tube. This is beneficial because it decreases the stress on the coupled drive shafts and the motor mount.

The motor connects directly to the computer and will be controlled by the LabView user input. The DC power supply will power the motor.

Figure 8:
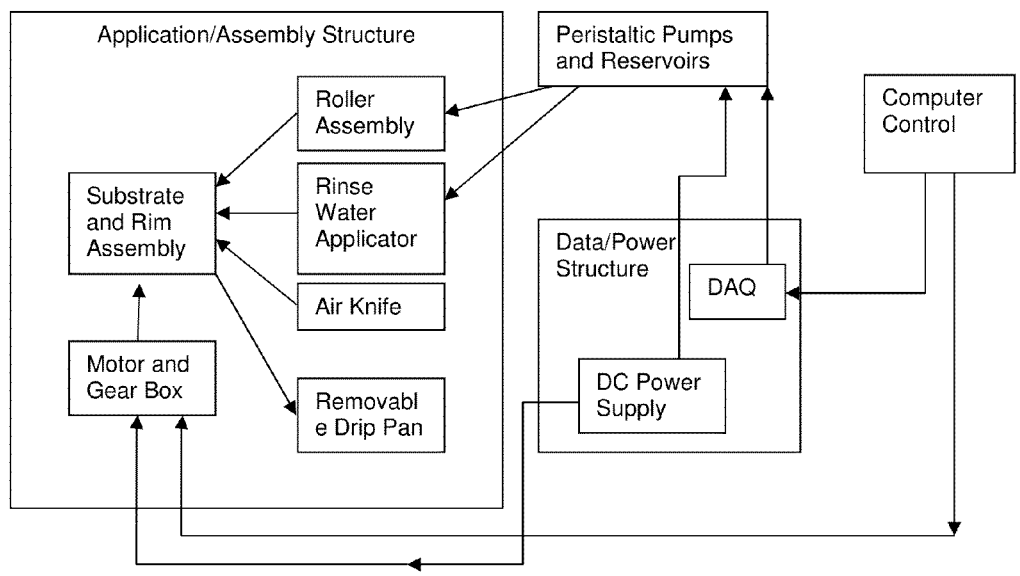
FIG. 8 is a block diagram showing the arrangement of the various subsystems in the whole of a rolling contact layer-by-layer assembly device.

Referring now to FIG. 8, a block diagram is shown illustrating the connections of the various subsystems that comprises an embodiment of a rolling contact layer-by-layer assembly device. The system can have three structures with hoses and wiring going between them. The block diagram shows the multiple structures and within each and the processes that are performed by each.

Methods include operating the various components of the rolling contact layer-by-layer assembly device in the following ways. Fill proper reservoirs with desired solutions/colloids. Attach tape to glass cylinder using double-sided tape. Attach glass cylinder to mounting wheel. Slide mounting wheel assembly over driveshaft. Insure correct number and placement of rollers around substrate. Release locking pins from rollers to create contact with substrate. Direct air nozzles and water nozzles to correct orientation. Correctly place partitioning walls (i.e., shields) between air and rinse sections. Using LabView, turn substrate several cycles to insure proper alignment of components without any fluid flow. Make any necessary corrections. In LabView, indicate which pumps to run, rotation speed, and number of bilayers desired. Close assembly lid. Start LBL Assembly in LabView. After assembly is complete, open lid and insure everything is turned off. Pull back rollers and lock in place. Carefully lift cylinder assembly off of driveshaft. Remove tape from cylinder.

The rolling contact layer-by-layer assembly device can be operated using the following parameters to produce a LBL film product: cycle time (rotation>0.625 RPM), film assembly time (time<8 hours), film size (film>50 cm$^2$), with good film uniformity. The device can complete a single cycle (one bi-layer) in a set amount of time. The total time for about 300 bi-layers can be less than 8 hours, which means a single cycle can take less than about 1.6 minutes (or greater than 0.625 RPM). The rotation speed can be adjusted until the maximum speed is reached that still achieves complete drying, since drying time will be the limiting aspect. Once this speed is reached, a point on the cylinder can be marked and a single revolution will be timed, and it can be less than about 1.6 minutes.

If the desired cycle time requirement is not met, several changes can be made to achieve it. The maximum speed can be increased by repositioning the air or water nozzles or adding more nozzles. The solution flow rate can also be reduced to deposit less material onto the substrate. If the film is not uniform enough, the device can be tuned to increase uniformity. The force of the roller on the substrate can be adjusted using the torsion spring screw and the position of the roller assembly on the mounting plate can be adjusted. Also, the rotation speed can be adjusted if production would still fit within the desired time requirements. Solution deposition can also be changed by adjusting the flow rate or using a different roller material.

The embodiments and the examples described herein are exemplary and not intended to be limiting in describing the full scope of apparatus, systems, and methods of the present technology. Equivalent changes, modifications and variations of some embodiments, materials, compositions and methods can be made within the scope of the present technology, with substantially similar results.

What is claimed is:

1. A rolling contact layer-by-layer assembly device comprising:
   a cylindrical substrate supported by a portion of a rim assembly in driving engagement with a drive shaft operable to rotate the rim assembly and cylindrical substrate;
   a mounting plate having a central region through which at least a portion of the drive shaft is disposed;
   a first roller disposed on the mounting plate in a first position around the central region operable to engage a surface of the cylindrical substrate, the first roller having a first solution delivered thereto and configured to apply the first solution at a nanoscale thickness; and
   a second roller disposed on the mounting plate in a second position around the central region operable to engage the surface of the cylindrical substrate, the second roller having a second solution delivered thereto and configured to apply the second solution at a nanoscale thickness, wherein the first solution and the second solution have an affinity for each other.

2. The device of claim 1, further comprising a removable substrate film affixed to at least a portion of the surface of the cylindrical substrate and the rollers engage the surface of the removable substrate film.

3. The device of claim 1, further comprising a rinsing system disposed on the mounting plate in a third position around the central region configured to rinse the cylindrical substrate when a layer of solution is applied via the first or second roller.

4. The device of claim 1, further comprising a drying system disposed on the mounting plate in a third position around the central region configured to apply a stream of gas to the cylindrical substrate when a layer of solution is applied via the first or second roller.

5. The device of claim 4, further comprising a shield to limit application of the stream of gas of the drying system to a smaller portion of the cylindrical substrate.

6. The device of claim 1, further comprising a drip plate attached to the mounting plate configured to collect liquid running off of the cylindrical substrate.

7. The device of claim 1, wherein the first position of the first roller and the second position of the second roller are on substantially opposite sides of the central region of the mounting plate, so that the first roller and the second roller are positioned on substantially opposite sides of the cylindrical substrate.

8. The device of claim 1, further comprising an inflatable member disposed around the rim assembly that contacts and engages an inner diameter of the cylindrical substrate.

9. The device of claim 1, wherein the first roller is held in contact with the cylindrical substrate by a first torsion spring and the second roller is held in contact with the cylindrical substrate by a second torsion spring.

10. The device of claim 1, further comprising a tube component disposed within the central region of the mounting plate through which the drive shaft passes for engagement with the rim assembly.

11. The device of claim 1, wherein the cylindrical substrate and the rollers are dimensioned such that both have tubular cross-sections.

12. The device of claim 1, wherein the mounting plate comprises a plurality of radial slots around the central region for adjustment of the first position of the first roller and second position of the second roller with respect to the cylindrical substrate.

* * * * *